July 14, 1936.  H. G. SPECHT  2,047,752
LUBRICATED PLUG VALVE
Filed Nov. 28, 1933
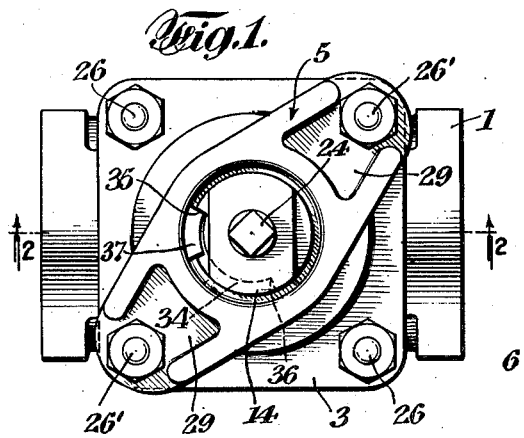
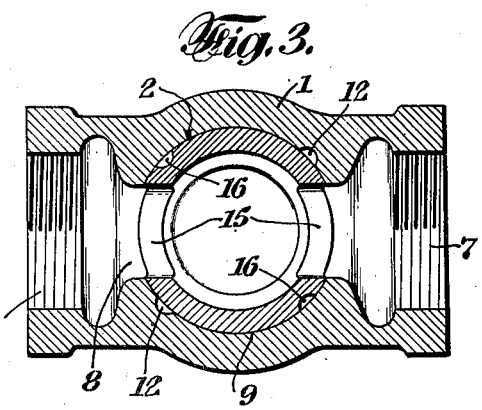
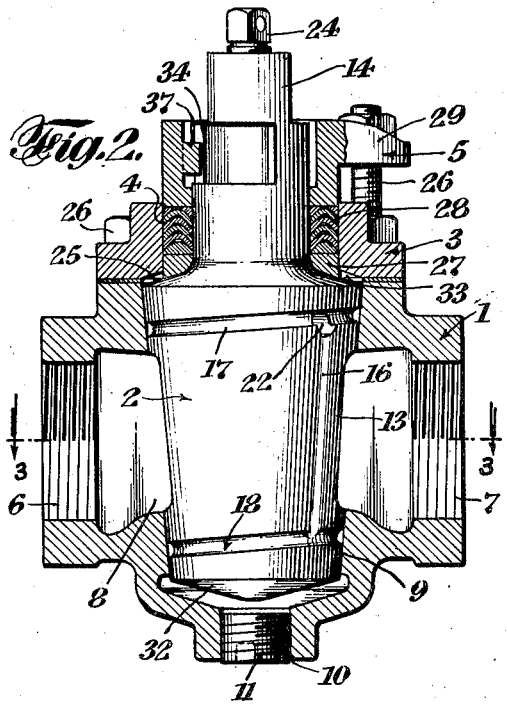
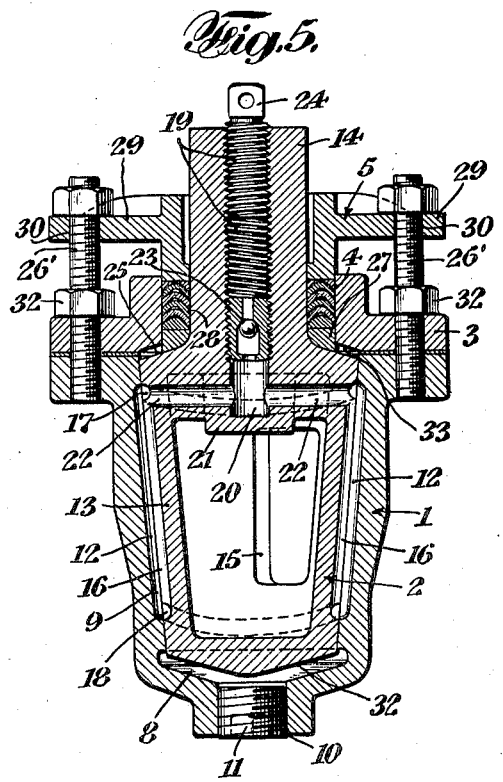
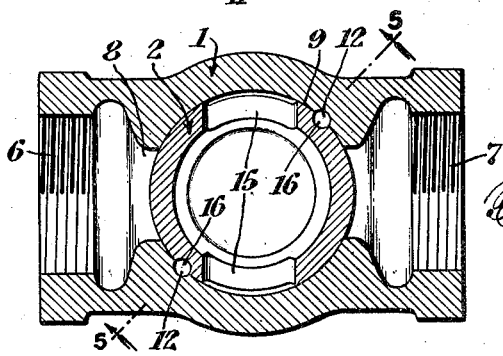
INVENTOR
Harry G. Specht
BY
Prindle, Bean & Mann
ATTORNEYS Patented July 14, 1936

2,047,752

UNITED STATES PATENT OFFICE 2,047,752

LUBRICATED PLUG VALVE

Harry G. Specht, Montclair, N. J., assignor to Eastwood-Nealley Corporation, Belleville, N. J., a corporation of New Jersey Application November 28, 1933, Serial No. 700,025

7 Claims. (Cl. 251—93)

This invention relates to improvements in lubricated plug valves and the principal object of this invention is the provision of a device of this kind which is simple and strong in construction and safe and lasting in operation, in which the parts are thoroughly lubricated and sealed and leakage and breakage prevented.

To the accomplishment of the foregoing and such other objects as may hereinafter appear, this invention consists in the construction, combination and arrangement of parts hereinafter described and then sought to be defined in the appended claims, reference being had to the accompanying drawing forming a part hereof and which shows, merely for the purpose of illustrative disclosure, a preferred embodiment of my invention, it being expressly understood, however, that various changes may be made in practice within the scope of the claims without digressing from my inventive idea.

In the drawing—

Figure 1 is a top plan view of one form of construction which embodies my invention.

Figure 2 is a vertical cross section of the casing or body with the plug valve proper shown in side elevation in open position.

Figure 3 is a horizontal cross section taken on line 3—3 of Figure 2.

Figure 4 is a view similar to Figure 3 with the valve shown in shut or closed position.

Figure 5 is a cross section taken on a vertical plan substantially along the line of 5—5 in Figure 4.

Referring now to the drawing, the numeral 1 designates the body, 2 the plug or valve, 3 the cover having the enlarged opening 4, and 5 the packing gland.

The body 1 is in the form of a casing having the inlet 6 and outlet 7 leading to the central chamber 8 which is formed so as to provide the tapered seat 9 for the valve 2. The lower part of the casing is provided with the screw threaded opening 10 which is closed by the nut 11. The opposite walls of the seat 9 are each provided with a vertically arranged lubricant groove 12 which are located adjacent the inlet and outlet openings into the chamber 8. These grooves extend for a substantial part of the length of the plug valve 2, but terminate short of the ends thereof.

The plug valve 2 is formed of a body part 13 and a neck or stem 14. The body part is of frusto-conical shape and adapted to have a tight rotative fit with the conical seat 9 in the body or casing 1. The body of the valve 13 is hollow and provided with the oppositely disposed ports 15 which are adapted to register with the inlet and outlet ports 6 and 7 when the valve is in open position as shown in Figure 3. When the valve is turned by means of the stem or neck 14 to closed position, the ports 15 of course are positioned at right angles and are sealed against the walls of the seat 9 in the body or casing 1.

The valve 13 is provided on its outer surface with two vertical grooves 16 which are diametrically or oppositely disposed and located adjacent the ports 15. The valve body 13 is also provided with a circumferential groove 17 near its upper end and a circumferential groove 18 near its lower end. These grooves 17, 18 extend at an angle to a true horizontal plane and are of course spaced from the extreme ends of the plug valve body 13. The vertical grooves 16 extend and connect the circumferential grooves 17 and 18.

The neck or stem 14 is centrally bored as at 19 to provide a lubricant receptacle or reservoir, the end 20 of this bore terminating within an extended portion 21 of the plug valve body 13. In this part of the body lateral ports or passages 22 are provided which afford a means of communication between the circumferential groove 17 and the lubricant receptacle or reservoir 19. A check valve 23 is provided in the lower portion of the bore 19 and the bore 19 is provided with a screw or bolt 24 whereby the lubricant may be forced from the receptacle or reservoir 19 past the check valve 23 through the ports or passages 22 and into the lubricant grooves.

A suitable shoulder or extended bearing portion 25 is provided between the body 13 of the valve and the neck or stem 14, the neck or stem of course being considerably less in diameter than the diameter of the valve body. The cover 3 is positioned on top of the body or casing 1 and secured thereto by two oppositely disposed bolts 26 and two oppositely disposed bolts 26'. This cover 3 has a central opening larger in diameter than the diameter of the neck or stem 14 so as to receive the stuffing box bushing 27 and the packing 28 between the cover 3 and the neck or stem 14. The packing gland 5 has an opening to receive the upper portion of the neck or stem 14 and has the laterally extended arms or wings 29 provided with apertures 30 to receive the bolts 26' which are secured to the body 1 and are provided in an intermediate position with nuts 31 adapted to bear against and hold the cover 3 on top of the body 1. By this construction the gland is pulled or forced down by means of bolts which are secured or connected to the body or casing 1 which provides a more secure packing gland construction and prevents cover leakage and cover breakage.

It is to be noted that the lower end 32 of the body 13 of the plug valve 2 is spaced from the inner surface of the body or casing 1 and that the shoulder or bearing portion 25 of the upper part of the body 13 of plug valve 2 is spaced from the cover 3 as indicated at 33 and is engaged only by the stuffing box bushing 27.

When in open position the vertical lubricant or grease grooves in both the body or casing 1 and the plug or valve 2 are not exposed to line pressure and operate to lubricate and seal the engaging surfaces of the valve and casing. When the valve is in closed position the respective grooves 12 and 16 register as shown in Figure 4 and again are not exposed to line pressure.

The neck or stem 14 may be provided with a cut out part 34 providing a shoulder 35 at one end and a shoulder 36 at the other end. The gland 5 may be provided with a suitable lug or projection 37 which is positioned in said cut out portion or groove and adapted to engage said shoulders 35 and 36 to limit the opening and closing rotative movement of the valve. It is also to be noted that the grooves 17 and 18 do not extend in a horizontal plane around the body 13 of the plug valve 2 but are so located on the plug cock as to make contact continuously with the vertical grooves in the body. As the spiral grooves are continuous around the body 13 of the plug and arranged near the top and bottom thereof, the opposed surfaces of the body or casing 1 and the plug valve 2 will be well lubricated between the extremities of the port openings 15 and the top and bottom of the plug. This arrangement provides complete lubrication and a complete seal at all times.

Experience has shown that a plug valve should always operate with the valve on its seat because if it is raised from its seat the operating line fluids flow between the valve and its seat and destroy the seal with the resultant scoring. In operation the greatest destructive wear is on the plug valve between the top and bottom planes of the port openings 15. The line pressure always has a tendency to raise the plug valve from its seat and to press it against the body in the direction of the line pressure. This raising pressure must be overcome through the packing gland and in the present construction where the gland is pulled or forced down by means of studs or bolts connected to the body, cover leakage is prevented and better gland operation insured.

In conventional plug valves lubricated by means of cooperating grooves these grooves are so placed that the lubricant is frequently washed out of the grooves in operation. In the present construction as none of the grooves are ever exposed to line pressure, there is no loss of lubricant by washing out and therefore better lubrication is insured. By the use of upper and lower grooves 17 and 18 in constant communication with the vertical grooves in the plug valve and also in the casing or body complete lubrication is insured and the possibility of cutting shoulders or grooves in the body is eliminated so that the plug valve always has an even and uniform seat within the casing or body. As the vertical grooves are never exposed to the line fluid in operation no sediment or scoring materials can lodge therein and thus wear out the valve and interfere with its proper operation.

What I claim is:

1. A lubricated plug valve, including, in combination, a casing having inlet and outlet openings and having a tapered valve seat, a valve member comprising a tapered plug valve body adapted to fit said tapered seat within said casing, said valve body being provided with an opening therethrough adapted to register with said inlet and outlet openings in said casing when said valve is in open position, said plug valve body being provided with two vertically arranged lubricant grooves in the outer surface thereof and two annular grooves in the outer surface thereof, one of said annular grooves being located near the top of said plug valve body and said other annular groove being located near the bottom thereof, said annular grooves intersecting said vertical grooves to form a continuous channel around the plug valve body, each of said annular grooves being located in a single plane extending at an angle to the horizontal so that the grooves constitute an elliptical zone about the outside of the plug body arranged at an angle to the horizontal.

2. A lubricated plug valve, including, in combination, a casing, having a tapered valve seat, a tapered plug adapted to fit said tapered seat, said casing being provided with a plurality of vertically arranged lubricant grooves, said tapered plug having continuous elliptical grooves formed in its outer surface, each elliptical groove being located in a single plane at an angle to the true horizontal, one of said elliptical grooves being located in the upper part of said tapered plug and the other in the lower part of said tapered plug, said tapered plug being also provided with vertical lubricant grooves, each of said vertical lubricant grooves being connected with said elliptical grooves, said vertical lubricant grooves in the casing being of such length as to intersect and communicate with said elliptical grooves in all positions of the tapered plug whereby complete lubricant conduits are provided at all times.

3. A lubricated plug valve, including, in combination, a casing having inlet and outlet openings and a tapered valve seat, the opposite walls of the seat each being provided with a vertically arranged lubricant groove, a valve member comprising a tapered plug adapted to fit said tapered seat, said plug being provided with a transverse opening therethrough adapted to register with said inlet and outlet openings in said casing when the valve is in open position, said plug being provided with longitudinally disposed lubricant grooves, and endless peripheral grooves in the outer surface thereof, one of said peripheral grooves being located above the transverse opening through the plug and the other of said peripheral grooves being located below the transverse opening through the plug and intersecting the longitudinal grooves in the plug to form interconnected circulatory conduits, each of said endless peripheral grooves being in an elliptical zone having a substantial tilt relative to the longitudinal axis of the plug, whereby the rotary action of the plug will lubricate a substantial part of the tapered valve seat without cutting shoulders or grooves in the face of said seat, and said vertical lubricant grooves in the casing being of such a length that they will always intersect and be in communication with said peripheral grooves on the tapered plug.

4. A lubricated plug valve, including, in combination, a casing having inlet and outlet openings and a tapered valve seat, a valve member comprising a tapered plug adapted to fit said tapered seat, said plug being provided with a transverse opening therethrough adapted to register with said inlet and outlet openings in said casing when the valve is in open position, said plug being provided with longitudinally disposed lubricant grooves and endless peripheral grooves in the outer surface thereof, said peripheral grooves being located one above and another below the transverse opening through the plug and adjacent the tapered seat and intersecting the longitudinal grooves to form interconnected circulatory conduits, and each of said endless peripheral grooves being in an elliptical zone having a substantial tilt relative to the longitudinal axis of the plug, whereby the rotary operation of the plug will lubricate a substantial part of the tapered valve seat without cutting shoulders or grooves in the face of said seat.

5. A lubricated plug valve, including, in combination, a casing having inlet and outlet openings and a tapered valve seat, a valve member comprising a tapered plug adapted to fit said tapered seat, said plug being provided with a transverse opening therethrough adapted to register with said inlet and outlet openings in said casing when the valve is in open position, said plug being provided with longitudinally disposed lubricant grooves and endless peripheral grooves in the outer surface thereof, said peripheral grooves being located one above and another below the transverse opening through the plug and adjacent the tapered seat and intersecting the longitudinal grooves to form interconnected circulatory conduits, and each of said endless peripheral grooves being in an elliptical zone having a substantial tilt relative to the longitudinal axis of the plug, whereby the rotary operation of the plug will lubricate a substantial part of the tapered valve seat without cutting shoulders or grooves in the face of said seat, said peripheral grooves being substantially parallel with respect to each other.

6. A lubricated plug valve, including, in combination, a casing having inlet and outlet openings and a tapered valve seat, a valve member comprising a tapered plug adapted to fit said tapered seat, said plug being provided with a transverse opening therethrough adapted to register with said inlet and outlet openings in said casing when the valve is in open position, said plug being provided with longitudinally disposed lubricant grooves and endless peripheral grooves in the outer surfaces thereof, said peripheral grooves being located one above and another below the transverse opening through the plug and adjacent the tapered seat and intersecting the longitudinal grooves to form interconnected circulatory conduits, and each of said endless peripheral grooves being in an elliptical zone having a substantial tilt relative to the longitudinal axis of the plug, whereby the rotary operation of the plug will lubricate a substantial part of the tapered valve seat without cutting shoulders or grooves in the face of said seat, the angle of said peripheral grooves being such as to insure lubrication for a substantial part of the surface of the tapered valve seat, but at no time exposing any of the grooves to the line fluid.

7. A lubricated plug valve, including, in combination, a casing having inlet and outlet openings and a tapered valve seat, a valve member comprising a tapered plug adapted to fit said tapered seat, said plug being formed with a lubricant reservoir and having ports or passages connecting said reservoir to the outer surface of said plug, said plug being provided with a transverse opening therethrough adapted to register with said inlet and outlet openings in said casing when the valve is in open position, said plug being provided with longitudinally disposed lubricant grooves and endless peripheral grooves in the outer surface thereof, the peripheral grooves being located one above and another below the transverse opening through the plug and adjacent the tapered seat and intersecting the longitudinal grooves to form inter-connected channels in the form of circulatory conduits, said ports or passages in said plug opening into said grooves at said intersections, and each of said endless peripheral grooves being in an elliptical zone having a substantial tilt relative to the longitudinal axis of the plug whereby the rotary operation of the plug will lubricate a substantial part of the tapered valve seat without cutting shoulders or grooves in the face of said seat and whereby there is at all times a complete lubricating circuit from the reservoir.

HARRY G. SPECHT.